(12) United States Patent
Fuller et al.

(10) Patent No.: US 10,443,712 B2
(45) Date of Patent: Oct. 15, 2019

(54) OPEN LOOP CONTROL SYSTEM FOR A MEMS MICROVALVE

(71) Applicant: DunAn Microstaq, Inc., Austin, TX (US)

(72) Inventors: E. Nelson Fuller, Manchester, MI (US); Parthiban Arunasalam, Austin, TX (US); Wayne C. Long, Austin, TX (US); Arvind P. Rao, Austin, TX (US); Kevin Sinkar, Austin, TX (US); Gengxun K. Gurley, Hutto, TX (US)

(73) Assignee: DunAn Microstaq, Inc., Austin, TX (US)

( * ) Notice: Subject to any disclaimer, the term of this patent is extended or adjusted under 35 U.S.C. 154(b) by 190 days.

(21) Appl. No.: 15/797,847

(22) Filed: Oct. 30, 2017

(65) Prior Publication Data

US 2018/0119799 A1    May 3, 2018

Related U.S. Application Data

(60) Provisional application No. 62/415,682, filed on Nov. 1, 2016.

(51) Int. Cl.
| | |
|---|---|
| *F16H 61/00* | (2006.01) |
| *G05D 7/06* | (2006.01) |
| *G05B 15/02* | (2006.01) |
| *G05D 16/20* | (2006.01) |
| *F16H 61/10* | (2006.01) |
| *F16H 59/68* | (2006.01) |

(Continued)

(52) U.S. Cl.
CPC ...... *F16H 61/0021* (2013.01); *F16H 61/0009* (2013.01); *G05B 15/02* (2013.01); *G05D 7/0635* (2013.01); *G05D 16/2013* (2013.01); *F16H 59/72* (2013.01); *F16H 61/10* (2013.01); *F16H 2059/683* (2013.01); *F16K 99/0011* (2013.01); *F16K 99/0028* (2013.01); *F16K 99/0044* (2013.01)

(58) Field of Classification Search
None
See application file for complete search history.

(56) References Cited

U.S. PATENT DOCUMENTS

| | | |
|---|---|---|
| 7,192,005 B2 | 3/2007 | Denyer et al. |
| 8,427,806 B2 | 4/2013 | Benson et al. |

(Continued)

*Primary Examiner* — Justin Holmes
(74) *Attorney, Agent, or Firm* — MacMillan, Sobanski & Todd, LLC

(57) ABSTRACT

A system for controlling fluid pressure to a transmission system through a MEMS microvalve includes a transmission controller configured to receive a target command pressure, a current system command pressure input signal, and a transmission system operating temperature. A power determination module determines a temperature-related power factor from the target command pressure, the current system command pressure input signal, the transmission system operating temperature received in the controller, and a look-up table within the controller. A power signal module adjusts the current system command pressure input signal by the temperature-related power factor and applies the adjusted current system command pressure input signal to the MEMS microvalve via the controller.

12 Claims, 7 Drawing Sheets

(51) Int. Cl.
F16K 99/00 (2006.01)
F16H 59/72 (2006.01)

(56) References Cited

U.S. PATENT DOCUMENTS

| | | | | |
|---|---|---|---|---|
| 8,845,491 | B2* | 9/2014 | Li | F16H 61/0251 |
| | | | | 192/85.63 |
| 9,505,608 | B2 | 11/2016 | Arunasalam et al. | |
| 2006/0243331 | A1* | 11/2006 | Fuller | F04B 27/1804 |
| | | | | 137/596.16 |
| 2007/0288148 | A1* | 12/2007 | Cui | F16H 61/0021 |
| | | | | 701/51 |
| 2008/0236539 | A1* | 10/2008 | Zheng | F16H 59/68 |
| | | | | 123/197.1 |
| 2010/0137093 | A1* | 6/2010 | Collins | F16H 59/68 |
| | | | | 475/127 |
| 2012/0145252 | A1 | 6/2012 | Hunnicutt | |

* cited by examiner

OPEN LOOP CONTROL SYSTEM FOR A MEMS MICROVALVE

BACKGROUND OF THE INVENTION

This invention relates in general to systems for controlling fluid pressure to a transmission during gear shifts. In particular, this invention relates to an improved system for controlling fluid pressure to a transmission during gear shifts by using a MEMS microvalve to more precisely control command pressure to the transmission over a range of transmission operating parameters, such as operating temperature, voltage, and pressure.

Conventional transmissions may include pressure control valves, shift valves, and flow control valves. The pressure control valves and flow control valves control the pressure and flow of hydraulic fluid in the transmission, respectively. The shift valves, on the other hand, control various components of the transmission to achieve a desired gear ratio. The shift valves may also be used for precise pressure control during gear shifts; i.e., "shift pressure."

Precise pressure control may improve a quality of the shift and/or a speed of the shift. When the shift pressure is too high, for example, the vehicle operator may experience rough shifting. When the shift pressure is too low, the transmission clutches may be caused to overheat. The impact of such high and low shift pressure on a conventional transmission is explained in U.S. Pat. No. 8,427,806, the disclosure of which is incorporated herein by reference.

Solenoid operated valves, which are currently the industry standard for automotive transmission control, are current controlled devices. One example of such a conventional solenoid operated valve 5 is shown in FIG. 2, which is reproduced from U.S. Pat. No. 7,192,005, the disclosure of which is also incorporated herein by reference.

Thermally actuated MEMS control valves, such as MEMS microvalves, are power controlled devices. Because they are power controlled rather than current controlled like solenoid operated valves, MEMS control valves therefore require a different control scheme and method than used for solenoid operated valves. One example of MEMS control valve suitable for use with this invention is the MEMS microvalve disclosed in U.S. patent application Ser. No. 14/713,332, the disclosure of which is incorporated herein by reference.

It would be desirable to provide an improved system for controlling fluid pressure to a transmission during gear shifts by using a MEMS microvalve to more precisely control command pressure to the transmission over a range of transmission operating parameters, wherein precise control is achieved by determining and providing a required level of power to the MEMS microvalve to achieve a desired command pressure.

SUMMARY OF THE INVENTION

This invention relates to systems for controlling fluid pressure to a transmission during gear shifts. In particular, this invention relates to an improved system for controlling fluid pressure to a transmission during gear shifts by using a MEMS microvalve to more precisely determine a magnitude and direction of a change in power to achieve a desired new pressure. Thus, command pressure to the transmission over a range of transmission operating parameters, such as operating temperature, voltage, and pressure may be controlled. The change in power may be influenced by factors acting on the MEMS microvalve, including fluid temperature, fluid pressure, hysteresis, a dither signal, and thermal lag.

One embodiment of a system for controlling fluid pressure to a transmission system through a MEMS microvalve includes a transmission controller configured to receive a target command pressure, a current system command pressure input signal, and a transmission system operating temperature. A power determination module determines a temperature-related power factor from the target command pressure, the current system command pressure input signal, the transmission system operating temperature received in the controller, and a look-up table within the controller. A power signal module adjusts the current system command pressure input signal by the temperature-related power factor and applies the adjusted current system command pressure input signal to the MEMS microvalve via the controller.

Other advantages of the invention will become apparent to those skilled in the art from the following detailed description, when read in view of the accompanying drawings.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
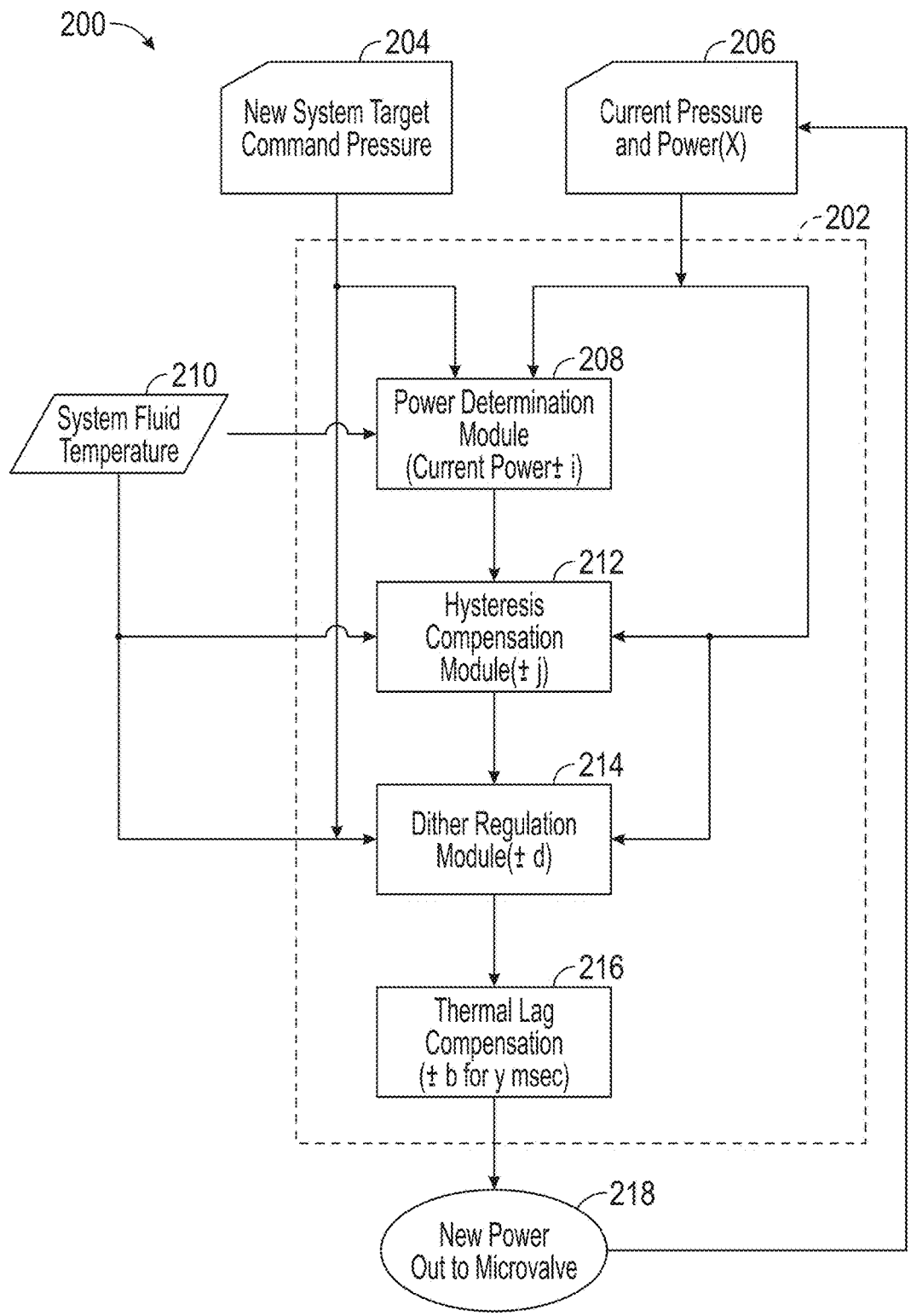
FIG. 1 is a block chart illustrating one embodiment of the open loop control system according to the invention.
Figure 2:
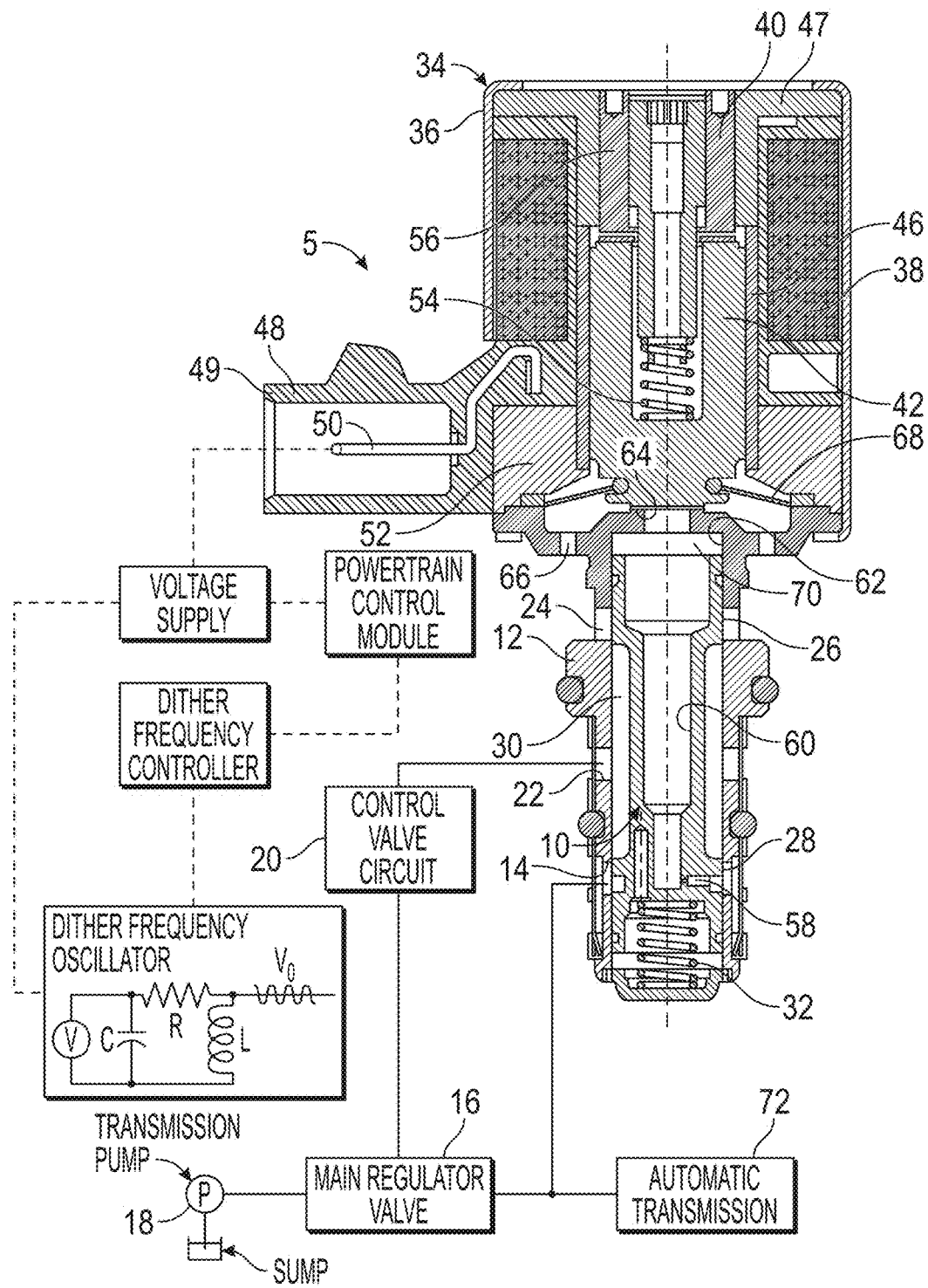
FIG. 2 is a cross sectional view of a conventional solenoid operated valve reproduced from U.S. Pat. No. 7,192,005.

FIG. 2 illustrates a conventional solenoid operated valve 5, and is reproduced from U.S. Pat. No. 7,192,005, the disclosure of which is incorporated herein by reference. In the embodiment of the solenoid operated valve 5, issues may arise when attempting to achieve precise control of command pressure due to a typically wide range of transmission operating parameters. Such parameters include, for example: temperatures in a range of from about −30 degrees C. to about +125 degrees C., voltage in a range of from about 9 volts of direct current (VDC) to about 16 VDC, and operating pressures in a range of from about 40 psi to about 300 psi or higher. Accordingly, correction factors are required to achieve the desired precise control. Such correction factors are described below in the embodiment of the improved open loop control system according to the invention and are shown at 200 in FIG. 1.

FIG. 2 illustrates the conventional solenoid operated valve 5 configured for control of an automotive transmission 72. The solenoid operated valve 5 includes a valve spool 10 positioned in a valve body 12. A fluid pressure inlet port 14 may be formed in the valve body 12 and may be configured to communicate with a main pressure regulator valve 16 of an automatic transmission control system (shown at 16, 18, and 20). The main pressure regulator valve 16 may be supplied with fluid pressure by a transmission pump 18 driven by an engine in a vehicle driveline (not shown). The main pressure regulator valve 16 communicates with a transmission control valve circuit 20 and with valve pressure ports 22 and 14 in the valve body 12.

The automatic transmission 72 may include transmission ratio shift valves (not shown) that respond to regulated line pressure. Controls of this type are well known in the art.

An exhaust port 24 is aligned with a valve land 26 on the valve spool 10. A companion valve land 28 is aligned with the inlet port 14. An annular space 30 surrounds the valve spool 10 is in communication with the control pressure port 22. The lands 26 and 28 control fluid flow between the control pressure port 22 and each of the ports 14 and 24. A spring 32 urges the valve spool 10 in an upward direction, as viewed in FIG. 2.

A solenoid actuator 34 is located at the upper end of the solenoid operated valve 5 shown in FIG. 2. The solenoid actuator 34 includes a solenoid housing 36 that may be secured to an upper end of the valve body 12. A solenoid coil 38 may be mounted in the solenoid housing 36, and surrounds a pole piece 40 and a movable armature 42. The armature 42 may be aligned with the pole piece 40 and may be separated therefrom by an air gap 44. An armature guide 46 may surround the armature 42 and guides movement of the armature 42 as the armature 42 is displaced by the electromagnetic field created by the solenoid coil 38.

An electrical connector 48 includes electrical leads 50 for the solenoid coil 38. A connector housing 49 may be secured between a lower flux washer 52 and the solenoid coil 38 within the solenoid housing 36. A flux flow path passes through the solenoid coil 38, an upper flux washer 47, the solenoid housing 36, the lower flux washer 52, the armature 42, the air gap 44, and then to the pole piece 40.

An armature spring 54 urges the armature 42 in a downward direction, as viewed in FIG. 2. The armature spring 54 may be seated on an adjustment screw 56 threadably mounted within the pole piece 40. The adjustment screw 56 may be used to adjust a force of spring 54 as the adjustment screw 56 is moved longitudinally within the pole piece 40.

The valve spool 10 may include a restricted flow passage 58 that communicates with a central pressure flow passage 60 in the valve spool 10. The central pressure flow passage 60 conducts fluid from the inlet port 14 to a pilot valve orifice 62 in the valve body 12. A pilot valve element 64 at a lower end of the armature 42 is aligned with the orifice 62 and establishes restricted and controlled communication between passage 60 and exhaust ports 66. The area between exhaust ports 66 and the movable armature 42 may be sealed by a flexible diaphragm seal 68.

When the solenoid coil 38 is energized, the armature 42 is aligned with the orifice 62, thereby controlling the pressure build-up in a pressure cavity 70. The pressure in the pressure cavity 70 creates a hydraulic pressure force on the valve spool 10, which opposes the force of spring 32 and the control pressure force acting on the other end of valve spool 10. Thus, the pressure at the control pressure port 22 is a function of the electromagnetic force of the armature 42 when an energizing current is applied to the coil 38.

Figure 3:
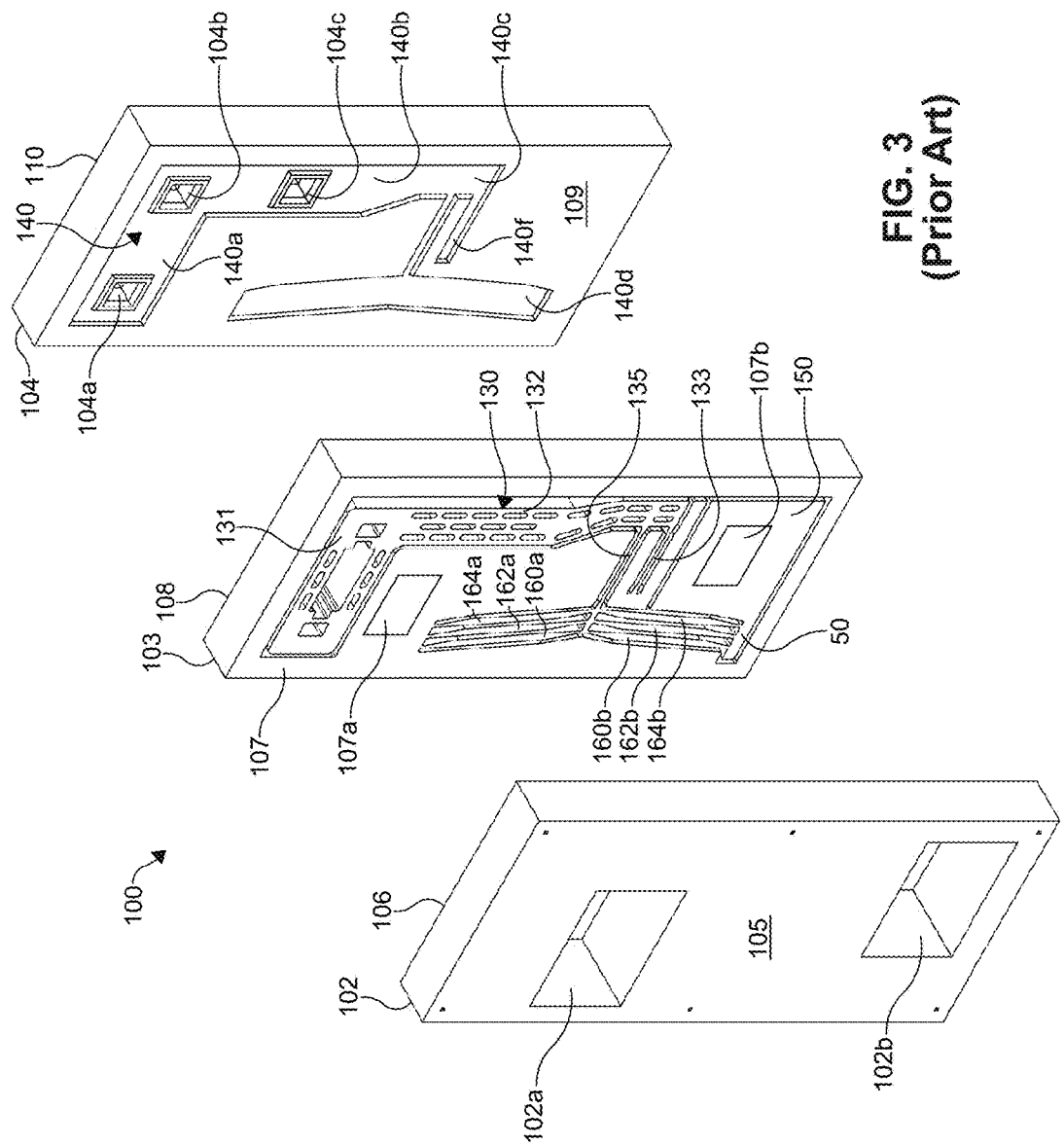
FIG. 3 is an exploded perspective view of a known MEMS microvalve showing a cover plate, an intermediate plate, and a base plate.
Figure 4:
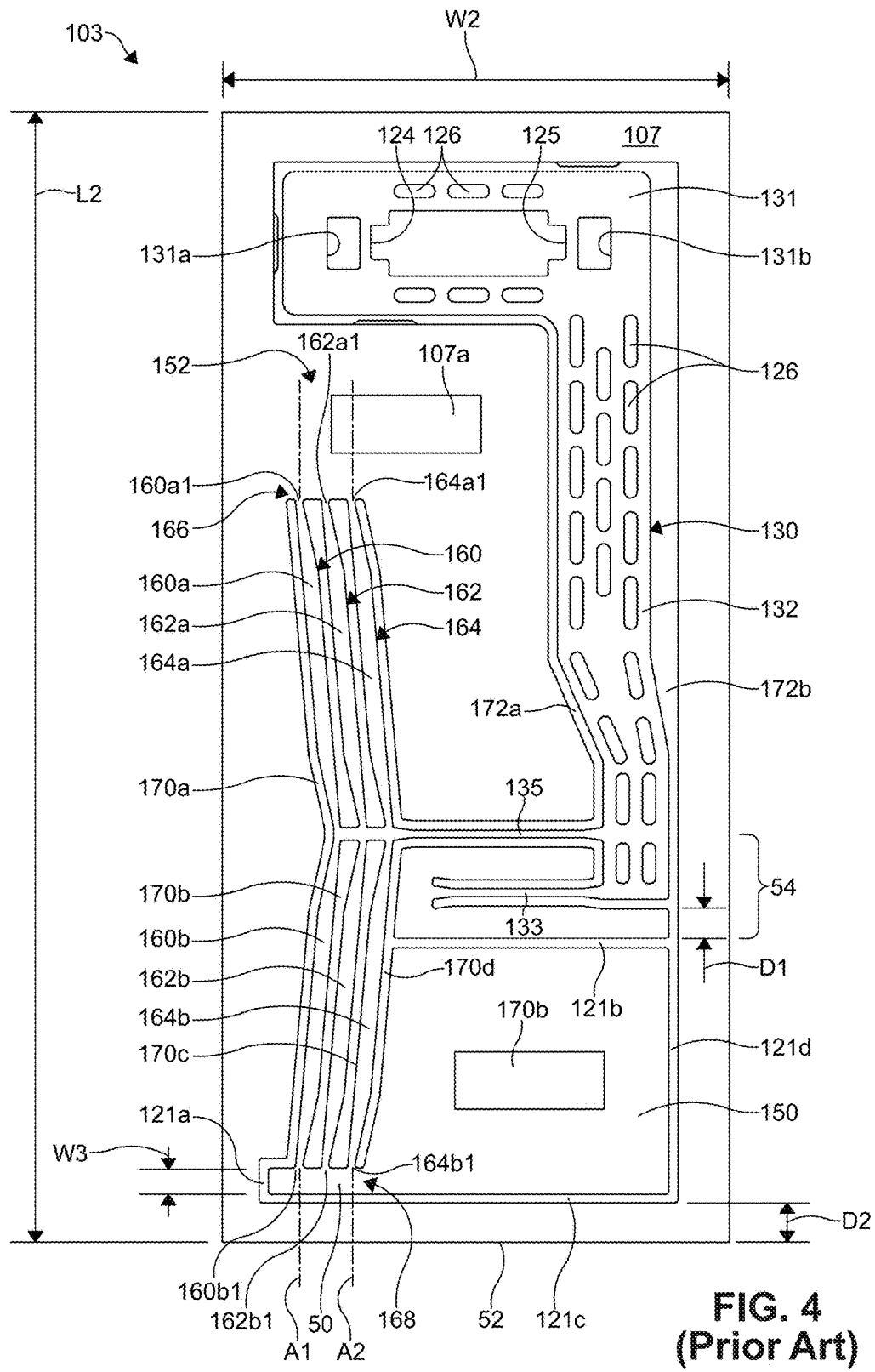
FIG. 4 is a plan view of the intermediate plate illustrated in FIG. 3.
Figure 5:
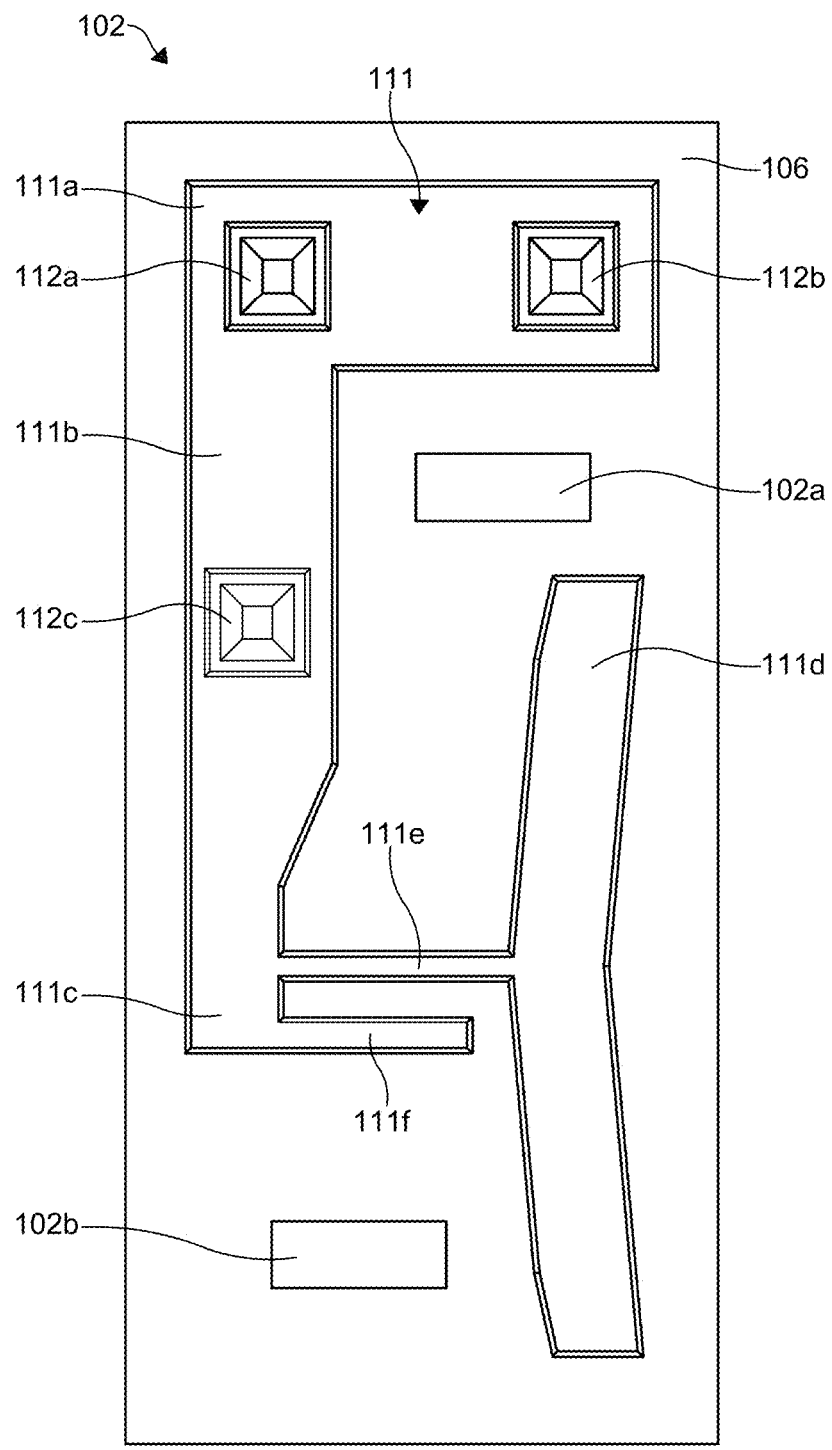
FIG. 5 is a plan view of the inner surface of the base plate illustrated in FIG. 4.

FIGS. 3 through 5 illustrate portions of an improved MEMS microvalve 100 in accordance with this invention. FIGS. 3 through 5 are reproduced from U.S. patent application Ser. No. 14/713,332, the disclosure of which is also incorporated herein by reference. The microvalve 100 includes a cover plate 102, an intermediate plate 103, and a base plate 104. The cover plate 102 has an outer surface 105 and an inner surface 106. The cover plate 102 also has one or more openings (two of such openings 102a and 102b are shown in the illustrated embodiment) formed therethrough that, in a manner that is well known in the art, allow one or more electrically conductive wires (not shown) to pass therethrough. The intermediate plate 103 has a first surface 107 and a second surface 108. The base plate 104 has an inner surface 109 and an outer surface 110. The base plate 104 also has one or more openings (three of such openings 104a, 104b, and 104c are shown in the illustrated embodiment) formed therethrough that, in a manner that is well known in the art, allow fluid to flow in to and out of the microvalve 100.

When the microvalve is assembled, the inner surface 106 of the cover plate 102 engages fixed portions of the first surface 107 of the intermediate plate 103, and the inner surface 109 of the base plate 104 engages fixed portions of the second surface 108 of the intermediate plate 103. The cover plate 102, the intermediate plate 103, and the base plate 104 can be retained in this orientation in any desired manner. For example, portions of the cover plate 102 and/or the base plate 104 may be bonded to the intermediate plate 103, such as by fusion bonding, chemical bonding, or physically bonding (such as, for example, mechanical fasteners and/or adhesives). The cover plate 102, the intermediate plate 103, and the base plate 104 may be composed of any desired material or combination of materials. For example, the cover plate 102, the intermediate plate 103, and the base plate 104 may be composed of silicon and/or similar materials. In the preferred embodiment of the present invention, the cover plate 102 and the base plate 104 are not electrically conductive, while the intermediate plate 103 is a doped silicon semiconductor material that heats and expands when electrical current is passed therethrough.

The structure of the inner surface 106 of the cover plate 102 of this invention is illustrated in detail in FIG. 5. As shown therein, the cover plate 102 of this invention includes an actuator cavity, indicated generally at 111, that is provided on the inner surface 106 thereof. The illustrated actuator cavity 111 includes an upper actuator arm cavity portion 111a, a central actuator arm cavity portion 111b, a lower actuator arm cavity portion 111c, an actuator rib cavity portion 111d, an actuator spine cavity portion 111e, and a hinge cavity portion 111f. The upper actuator arm cavity portion 111a has a pair of recessed areas 112a and 112b provided therein. A third recessed area 112c is formed in the central actuator arm cavity portion 111b.

As shown in FIG. 4, the intermediate plate 103 of this invention includes a displaceable member, indicated generally at 130, that includes a sealing portion 131 having a pair of pressure equalization openings 131a and 131b formed therethrough. The sealing portion 131 also includes notches 124 and 125, each defining a metering edge, for controlling the flow of fluid through the microvalve 100 and a plurality of pressure equalization openings 126. The pressure equalization openings 126, 131a, and 131b are configured to reduce or prevent pressure imbalances of the sealing portion 131 that would otherwise tend to cause movement of the arm portion 132 out of the plane of normal arcuate motion during actuation and un-actuation thereof.

The sealing portion 131 is connected through an elongated arm portion 132 to a hinge portion 133 that is formed integrally with the intermediate plate 103 of this invention. The elongated arm portion 132 is separated from the intermediate plate 103 by elongated openings 172a and 172b, as best shown in FIG. 4. The hinge portion 133 is formed in a pivot anchor region 54 defined between the central spine 135 and a channel 121b, described below, and between an elongated opening 170d and a channel 121d, both described below. In the illustrated embodiment, the channel 121b is spaced a distance D1 from the hinge portion 133. The distance D1 is preferably relatively small, such as within the range of about 20 µm to about 250 µm. It will be understood that the distance D1 needs only to be wide enough such that the material of the intermediate plate 103 between the hinge portion 133 and the channel 121b can be securely bonded to the adjacent cover plate 102 and base plate 104. The cover plate 102, the intermediate plate 103, and the base plate 104 may be formed of any desired material or combination of materials, such as silicon, single crystal silicon, and/or similar material.

The displaceable member 130 also includes a plurality of actuator rib pairs 160, 162, and 164. Each rib pair 160, 162, and 164 is separated from an adjacent rib pair or from the intermediate plate 103 by an elongated opening 170a, 170b, 170c, and 170d. Although only three actuator rib pairs are shown, any number of actuator rib pairs may be provided. The actuator rib pairs 160, 162, and 164 are connected through a central spine 135 to the elongated arm portion 132 at a location that is preferably intermediate of the sealing portion 131 and the hinge portion 133.

Each actuator rib pair 160, 162, and 164 includes a first rib 160a, 162a, and 164a, respectively, and a second rib 160b, 162b, and 164b, respectively. First ends 160a1, 162a1, and 164a1 of the first ribs 160a, 162a, and 164a (the upper ribs shown in FIG. 4) are flexibly joined to a first non-moving part of the intermediate plate 103 of this invention. Second ends of the first ribs 160a, 162a, and 164a are connected to the central spine 135. First ends 160b1, 162b1, and 164b1 of the second ribs 160b, 162b, and 164b (the lower ribs shown in FIG. 4) are flexibly joined to a second non-moving part of the intermediate plate 103 of this invention. Second ends of the second ribs 160b, 162b, and 164b are also connected to the central spine 135.

The first non-moving part of the intermediate plate 103 is electrically connected to a first bond pad 107a provided on the intermediate plate 103. This first non-moving part of the intermediate plate 103 further defines a non-electrically isolated region 152. The second non-moving part of the intermediate plate 103 is electrically connected to a second bond pad 107b provided on the intermediate plate 103.

The plurality of actuator rib pairs 160, 162, and 164 include at least a first outermost actuator rib pair, such as the rib pair 160, and a second outermost actuator rib pair, such as the rib pair 164, spaced apart from the first outermost rib pair 160. Rib axes A1 and A2 are defined as extending through and beyond the first ends of each rib in each of the outermost rib pairs 160 and 164 of the plurality of actuator rib pairs. In the illustrated embodiment, a first rib axis A1 is defined as extending through and beyond the first ends 160a1 and 160b1 of the actuator ribs 160a and 160b, respectively (the left-most rib pair when viewing FIG. 4). Similarly, a second rib axis A2 is defined as extending through and beyond the first ends 164a1 and 164b1 of the actuator ribs 164a and 164b, respectively (the right-most rib pair when viewing FIG. 4). A first rib attachment region 166 is defined between the first and second axes A1 and A2 at the first ends 160a1, 162a1, and 164a1 of the first ribs 160a, 162a, and 164a, and a second rib attachment region 168 is defined between the first and second axes A1 and A2 at the first ends 160b1, 162b1, and 164b1 of the second ribs 160b, 162b, and 164b.

The intermediate plate 103 may also include channels 121a, 121b, 121c, and 121d formed through the intermediate plate 103. The channels 121a, 121b, 121c, and 121d are formed through the intermediate plate 103 and connect the elongated opening 170a at the first ends 160b1, 162b1, and 164b1 of the second ribs 160b, 162b, and 164b to the elongated opening 170d at a position intermediate the central spine 135 and the first ends 160b1, 162b1, and 164b1 of the second ribs 160b, 162b, and 164b, and also to the elongated opening 172 between the elongated arm portion 132 and the intermediate plate 103.

The channels 121a, 121b, 121c, and 121d, and a longitudinally extending side edge one of the elongated opening 170d also define a boundary of an isolation region 150 that physically separates the isolation region 150 from the rest of the intermediate plate 103, except through the actuator rib pairs 160, 162, and 164. As discussed above, the cover plate 102 and the base plate 104 are electrically non-conductive. The second bond pad 107b formed in the isolation region 150 is thus electrically isolated from the first bond pad 107a, other than through the actuator rib pairs 160, 162, and 164. Significantly, the portion of the isolation region 150 located outside of the second rib attachment region 168 is larger than the second rib attachment region 168.

The channels 121a, 121b, 121c, and 121d may function as fluid flow passages and are configured to allow fluid flow within the intermediate plate 103 during operation of the microvalve 100. This fluid may cool the portions of the intermediate plate 103 immediately adjacent the channels 121a, 121b, 121c, and 121d. The channels 121a, 121b, 121c, and 121d may also allow air to be purged from near the first ends 160b1, 162b1, and 164b1 of the second ribs 160b, 162b, and 164b and out of the microvalve 100 through one of the openings 104a, 104b, and 104c.

In the illustrated embodiment, the channel 121c is spaced a distance D2 from an edge 52 of the intermediate plate 103. The distance D2 is preferably relatively small, such as within the range of about 50 µm to about 250 µm. It will be understood that the distance D2 needs only to be wide enough such that the material of the intermediate plate 103 between the channel 121c and the edge 52 can be securely bonded to the adjacent cover plate 102 and base plate 104.

In a manner that is well known in the art, electrical current may be passed from the first bond pad 107a through the plurality of actuator rib pairs 160, 162, and 164 to the second bond pad 107b within the isolation region 150. Such electrical current causes thermal expansion of the plurality of actuator rib pairs 160, 162, and 164, which causes axial movement of the central spine 135. As described above, the central spine 135 is connected to the elongated arm portion 132. Consequently, axial movement of the central spine 135 causes the elongated arm portion 132 (and, therefore, the sealing portion 131) of the displaceable member 130 to pivot about the hinge portion 133 or otherwise move relative to the rest of the intermediate plate 103 (such movement occurring within a plane defined by the rest of the intermediate plate 103). Thus, the illustrated displaceable member 130 functions as a micro-electro-mechanical system flow control element, i.e., the moveable part of a microvalve that directly controls flow through the microvalve. Furthermore, the plurality of actuator rib pairs 160, 162, and 164, cooperate with the central spine 135 to form a thermal actuator for selectively moving the displaceable member 130 to pivot about the hinge portion 133

The isolation region 150 includes a relatively narrow portion or strip 50 defined between the first ends 160b1, 162b1, and 164b1 of the second ribs 160b, 162b, and the passage 121c, extending parallel to the edge 52 of the intermediate plate 103. In the illustrated embodiment, the narrow strip 50 has a width W3 of about 0.2 mm. The narrow strip 50 may also have other desired widths, such as between 0.175 mm and 0.5 mm. It will be understood that the narrow strip 50 is formed from the same semiconductor material used to form the rest of the intermediate plate 103, for example silicon.

Advantageously, fluid flowing through the channels 121a, 121b, 121c, and 121d, and particularly through the channel 121c, is only spaced apart from the first ends 160b1, 162b1, and 164b1 by the width W3. Thus, the amount of cooling provided to the second ribs 160b, 162b, and 164b at the first ends 160b1, 162b1, and 164b1 thereof by the fluid is greater relative to an amount of cooling provided to the actuator ribs 34 in the isolation region 44 of the prior art microvalve 1.

The structure of the inner surface 109 of the base plate 104 of this invention is illustrated in detail in FIG. 3. As shown therein, the base plate 104 of this invention includes an actuator cavity, indicated generally at 140, that is provided on the inner surface 109 thereof. The illustrated actuator cavity 140 includes an upper actuator arm cavity portion 140a, a central actuator arm cavity portion 140b, a lower actuator arm cavity portion 140c, an actuator rib cavity portion 140d, an actuator spine cavity portion 140e, and a hinge cavity portion 140f.

Referring again to FIG. 4, the illustrated bond pad 107a is located adjacent (above when viewing FIG. 4) the first ends 160a1, 162a1, and 164a1 of the first ribs 160a, 162a, and 164a. The bond pad 107b is located adjacent the second ribs 160b, 162b, and 164b near the first ends thereof (to the right and above the first ends 160b1, 162b1, and 164b1 of the second ribs 160b, 162b, and 164b when viewing FIG. 4) and also above (when viewing FIG. 4) the narrow strip 50.

As described above, during actuation of the microvalve 100, the plurality of actuator rib pairs 160, 162, and 164 are heated by passing an electrical current therethrough. The actuator rib pairs 160, 162, and 164 then undergo thermal expansion and elongate, which urges the central spine 135 and the attached arm portion 132 away from the actuator rib pairs 160, 162, and 164 (to the right when viewing FIG. 4). The arm portion 132 then bends or flexes at the hinge portion 133 to accommodate movement of the central spine 135, thereby causing the sealing portion 131 and its notches 124 and 125 to move in the plane of normal motion along an arcuate path (to the right when viewing FIG. 4) to a stressed position, which closes the opening 104a and opens the opening 104b.

When the electrical current is removed from the plurality of actuator rib pairs 160, 162, and 164, the actuator rib pairs 160, 162, and 164 cool and contract, urging the central spine 135 back toward the actuator rib pairs 160, 162, and 164 (to the left when viewing FIG. 4). The arm portion 132 and sealing portion 131 then return to an un-actuated position, as shown in FIG. 4, wherein the opening 104a is again open, and the opening 104b is again closed.

As described above and shown in FIG. 4, the second bond pad 107b is adjacent the second ribs 160b, 162b, and 164b (to the right when viewing FIG. 4) and above (when viewing FIG. 4) the narrow strip 50.

Figure 6:
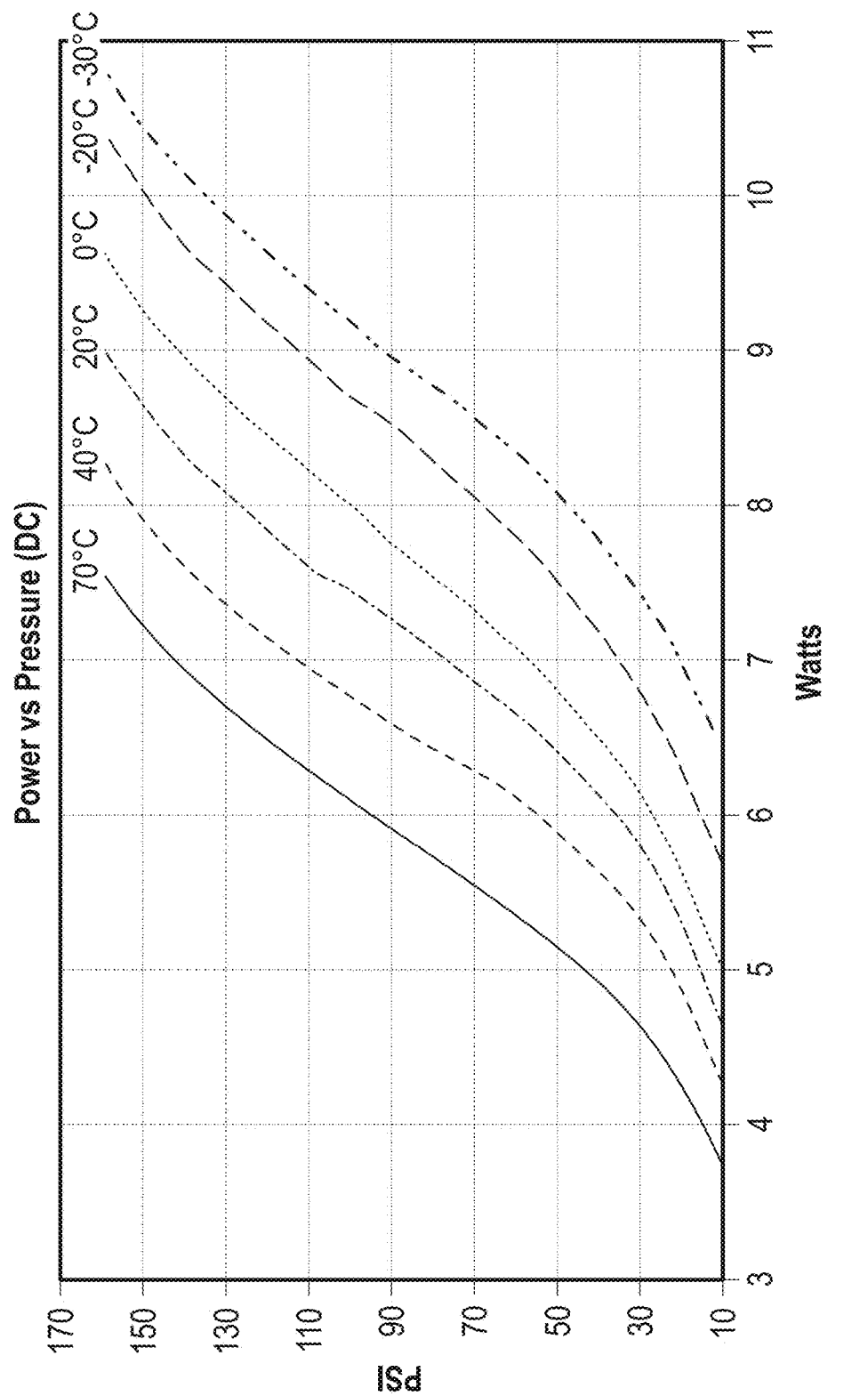
FIG. 6 is a graph showing a typical variation in the power required for a known MEMS microvalve at various system pressures and temperatures.
Figure 7:
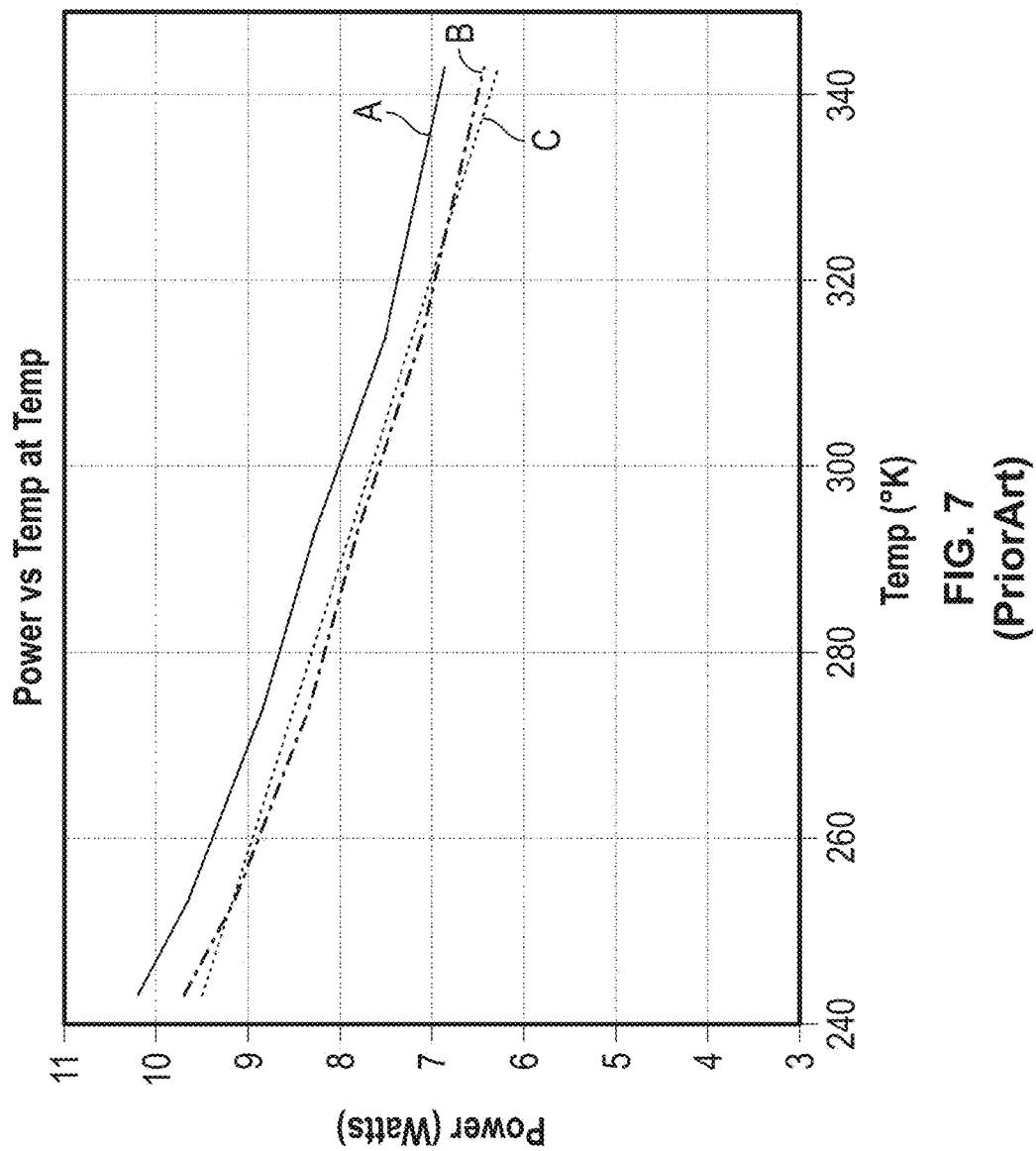
FIG. 7 is an alternative version of the graph of FIG. 6 showing constant pressure curves over a range of temperatures and power.

FIG. 6 is a graph that shows a typical variation in the power required for a MEMS microvalve, such as the MEMS microvalve 100, at various system pressures and temperatures. FIG. 7 is an alternative version of the data in FIG. 6, showing constant pressure curves over a range of temperatures (x axis) and power (y axis). The graph of FIG. 7 shows example constant pressure curves for 140 psi (line A) and 120 psi (line B). A linear representation of the 120 psi curve is shown at C and is derived from the equation: y=−0.0317x+17.213. It will be understood that the data from the curves A, B, and/or C may be converted into data readable in a look-up table.

The graph illustrated in FIG. 7 shows for example, that if it is desired to change the fluid pressure in the transmission from 120 psi (line B) to 140 psi (line A) and the transmission system temperature is about 320° K (47° C.), the power level would need to increase from about 7 watts to about 7.5 watts.

Similarly, data in the form of graphs and/or look-up tables may be developed to show the power change needed to compensate for hysteresis, a dither signal, and thermal lag.

Referring again to FIG. 1, an embodiment of the improved open loop control system for controlling fluid pressure to a transmission during gear shifts according to the invention is shown at 200. The illustrated open loop control system 200 includes receiving a system target command pressure 204 and a current system command pressure 206 and power X input signals in a controller, such as a transmission controller 202. The system target command pressure 204 and the current system command pressure 206 and power X input signal may be provided from estimates or from transmission fluid pressure measurements.

Heating of the ribs in each actuator pair 160, 162, and 164 may be influenced by the temperature and the pressure of the fluid flowing through the microvalve 100 as heat is conducted from the ribs in each rib pair 160, 162, and 164 through the fluid and the material, such as silicon, of the intermediate plate 103 surrounding the ribs. Under optimal conditions, such as when the microvalve 100 is operating at 293° K (20° C.) and 125 psi, a change in pressure would require an increase or decrease in power of X (watts).

The improved open loop control system 200 includes a power determination module 208 that may be used to determine a desired power level needed to attain a new command pressure; i.e., the target system command pressure 204. Due to varying operating temperature of the transmission system fluid 210, such as between about 233° K (−40° C.) and about 423° K (150° C.), the power determination module 208 may add or subtract a temperature-related power factor i (watts) to compensate for variation in the system fluid temperature 210. The temperature-related power factor i may be obtained from a look-up table that includes a plurality of desired temperature-related power factors i, each relating to a desired pressure. Alternatively, the temperature-related power factor i may be determined using a linear equation such as: y=−0.0317x+17.213, derived from the line B in FIG. 1.

Next, a hysteresis compensation module 212 may either add or subtract a hysteresis-related power factor j (watts) to the power of X (watts) to the MEMS microvalve 100 to compensate for hysteresis known to occur in MEMS microvalves. For example, because of the hysteresis, the power required to move the MEMS microvalve 100 from a pressure X psi to an increased pressure X+20 psi may be different (i.e., more or less) than the power required to move the MEMS microvalve 100 from the increased pressure X+20 to a lower pressure X. The amount of hysteresis in the MEMS microvalve 100 may be influenced by temperature, valve position, and to a lesser degree by pressure. The hysteresis-elated power factor j (watts) may be obtained from a look-up table that includes a plurality of desired hysteresis-related power factors j, each relating to a desired pressure.

In the next step of the system 200, a dither regulation module 214 may be used to adjust the power X (watts) to the MEMS microvalve 100 in response to a dither signal imposed on the power X (watts) to the MEMS microvalve 100. A low frequency dither signal, for example about 40 Hz, may overlay the power signal to the MEMS microvalve 100 in a known manner. The dither signal may therefore be a small ripple frequency that is superimposed over the power signal. This dither signal induces a small amount of movement into the displaceable member 130 of the MEMS microvalve 100 to reduce valve hysteresis, but does not affect the command pressure. For example, the dither signal may cause a valve element, i.e. the sealing portion 131 in the illustrated embodiment, to move rapidly or wiggle to prevent the sealing portion 131 from becoming stuck when the MEMS microvalve is caused to move between different command pressure settings. Thus, a dither-related power factor d (watts) may be added or subtracted from the power X (watts) to the MEMS microvalve 100 to compensate for the dither signal. The dither-related power factor d (watts) may be obtained from a look-up table that includes a plurality of desired dither-related power factors d, each relating to a desired pressure.

In an additional step of the system 200, a thermal-lag compensation module 216 may be used to determine a power factor b (watts) that may be added or subtracted from the power X (watts) to the MEMS microvalve 100 for a period of y msec, wherein y is a function of temperature and pressure and may be within the range of about 5 msec and about 20 msec. Because known MEMS microvalves, including the MEMS microvalve 100, are thermally actuated devices, a short pulse of power may be required to heat the ribs sufficiently quickly to affect a desired response. The thermal-lag related power factor b (watts) may be obtained from a look-up table that includes a plurality of desired thermal-lag related power factors b, each relating to a desired pressure.

It will be understood that the look-up tables described herein may be stored in a non-volatile memory of the transmission controller 202.

In a final step of the system 200, a power signal module 218 may then apply a new or adjusted power signal to the MEMS microvalve 100 to produce the desired target command pressure. As described above, the new power signal=X (watts)+/−i (watts)+/−j (watts)+/−d (watts)+/−b (watts), wherein:

X=the power input signal (watts) required to produce the current system pressure under optimal conditions;
i=the power adjustment made to compensate for variation in the system fluid temperature;
j=the power adjustment made to compensate for hysteresis known to occur in MEMS microvalves;
d=the power adjustment to compensate for the dither signal;
b=the power adjustment made to compensate for thermal-lag; and
y=the period of time (msec) that the power adjustment b made to compensate for thermal-lag is applied.

The principle and mode of operation of the invention have been described in its preferred embodiments. However, it should be noted that the invention described herein may be practiced otherwise than as specifically illustrated and described without departing from its scope.

What is claimed is:

1. A system for controlling fluid pressure to a transmission system through a Micro Electro-Mechanical Systems (MEMS) microvalve comprising:
a transmission controller configured to receive a target command pressure, a current system command pressure input signal, and a transmission system operating temperature;
a power determination module that determines a temperature-related power factor from the target command pressure, the current system command pressure input signal, the transmission system operating temperature received in the controller, and a look-up table within the controller; and
a power signal module that adjusts the current system command pressure input signal by the temperature-related power factor and applies the adjusted current system command pressure input signal to the MEMS microvalve via the controller; and
wherein the temperature-related power factor is measured in watts, is configured to compensate for variation in the transmission system operating temperature, and may be obtained from the look-up table that includes a plurality of desired temperature-related power factors relating to desired target command pressures.

2. The system according to claim 1, further including:
a hysteresis compensation module that determines a hysteresis-related power factor from the target command pressure, the current system command pressure input signal, the transmission system operating temperature received in the controller, and a look-up table within the controller;
wherein the power signal module further adjusts the current system command pressure input signal by the hysteresis-related power factor and applies the adjusted current system command pressure input signal to the MEMS microvalve via the controller;
wherein the hysteresis-related power factor is measured in watts and is configured to compensate for hysteresis that may occur in the MEMS microvalve, and may be obtained from the look-up table that includes a plurality of desired hysteresis-related power factors relating to a desired target command pressures.

3. The system according to claim 2, further including:
a dither regulation module that determines a dither-related power factor from the target command pressure, the current system command pressure input signal, a dither signal imposed on the current system command pressure input signal, the transmission system operating temperature received in the controller, and a look-up table within the controller;
wherein the power signal module further adjusts the current system command pressure input signal by the dither-related power factor and applies the adjusted current system command pressure input signal to the MEMS microvalve via the controller; and
wherein the dither-related power factor is measured in watts and is configured to be one of added and subtracted from a power value supplied to the MEMS microvalve to compensate for the dither signal, and may be obtained the look-up table that includes a plurality of desired dither-related power factors relating to desired target command pressures.

4. The system according to claim 3, further including:
a thermal lag compensation module that determines a thermal lag compensation power factor from the target command pressure, the current system command pressure input signal, the transmission system operating temperature received in the controller, and a look-up table within the controller;
wherein the power signal module further adjusts the current system command pressure input signal by the thermal lag power factor and applies the adjusted current system command pressure input signal to the MEMS microvalve via the controller; and
wherein the thermal lag compensation power factor is measured in watts and is configured to be one of added and subtracted from the power value supplied to the MEMS microvalve for a predetermined period of time to heat actuator ribs of the MEMS microvalve, and may be obtained from the look-up table that includes a plurality of desired thermal-lag related power factors relating to desired target command pressures.

5. The system according to claim 4, wherein the thermal lag compensation power factor may be applied for a period of time within the range of about 5 msec to about 20 msec.

6. The system according to claim 1, wherein the temperature-related power factor is determined using the linear equation $y=-0.0317x+17.213$, derived from a graph of power vs. temperature, wherein $y=$power and $x=$temperature.

7. A system for controlling fluid pressure to a transmission system through a Micro Electro-Mechanical Systems (MEMS) microvalve comprising:
a transmission controller configured to receive a target command pressure, a current system command pressure input signal, and a transmission system operating temperature;
a power determination module that determines a temperature-related power factor from the target command pressure, the current system command pressure input signal, the transmission system operating temperature received in the controller, and a look-up table within the controller;
a hysteresis compensation module that determines a hysteresis-related power factor from the target command pressure, the current system command pressure input signal, the transmission system operating temperature received in the controller, and a look-up table within the controller;
a dither regulation module that determines a dither-related power factor from the target command pressure, the current system command pressure input signal, a dither signal imposed on the current system command pressure input signal, the transmission system operating temperature received in the controller, and a look-up table within the controller;
a thermal lag compensation module that determines a thermal lag compensation power factor from the target command pressure, the current system command pressure input signal, the transmission system operating temperature received in the controller, and a look-up table within the controller;
and
a power signal module that adjusts the current system command pressure input signal by the temperature-related power factor, the hysteresis-related power factor, the dither-related power factor, and the thermal lag compensation power;

wherein the temperature-related power factor is measured in watts, is configured to compensate for variation in the transmission system operating temperature, and may be obtained from the look-up table that includes a plurality of desired temperature-related power factors relating to desired target command pressures;
wherein the hysteresis-related power factor is measured in watts and is configured to compensate for hysteresis that may occur in the MEMS microvalve, and may be obtained from the look-up table that includes a plurality of desired hysteresis-related power factors relating to desired target command pressures;
wherein the dither-related power factor is measured in watts and is configured to be one of added and subtracted from a power value supplied to the MEMS microvalve to compensate for the dither signal, and may be obtained from the look-up table that includes a plurality of desired dither-related power factors relating to desired target command pressures; and
wherein the thermal lag compensation power factor is measured in watts and is configured to be one of added and subtracted from the power value supplied to the MEMS microvalve for a predetermined period of time to heat actuator ribs of the MEMS microvalve, and may be obtained from the look-up table that includes a plurality of desired thermal-lag related power factors relating to desired target command pressure.

8. The system according to claim 7, wherein the thermal lag compensation power factor may be applied for a period of time within the range of about 5 msec to about 20 msec.

9. A method for controlling a Micro Electro-Mechanical Systems (MEMS) microvalve within a pressure-fluid system, the method comprising:
receiving a target command pressure in a controller;
receiving a current system command pressure input signal in the controller;
receiving a transmission system operating temperature in the controller;
determining a temperature-related power factor from the target command pressure, the current system command pressure input signal, and the transmission system operating temperature received in the controller; and
adjusting the current system command pressure input signal by the temperature-related power factor and applying the adjusted current system command pressure input signal to the MEMS microvalve via the controller;
wherein the temperature-related power factor is measured in watts, is configured to compensate for variation in the transmission system operating temperature, and may be obtained from a look-up table that includes a plurality of desired temperature-related power factors relating to desired target command pressures.

10. The method according to claim 9, further including:
determining a hysteresis-related power factor from the target command pressure, the current system command pressure input signal, and the transmission system operating temperature received in the controller; and
additionally adjusting the current system command pressure input signal by the hysteresis-related power factor and applying the adjusted current system command pressure input signal to the MEMS microvalve via the controller;
wherein the hysteresis-related power factor is measured in watts and is configured to compensate for hysteresis that may occur in the MEMS microvalve, and may be obtained from the look-up table that includes a plurality of desired hysteresis-related power factors relating to desired target command pressures.

11. The method according to claim 10, further including:
determining a dither-related power factor from the target command pressure, the current system command pressure input signal, a dither signal imposed on the current system command pressure input signal, and the transmission system operating temperature received in the controller; and additionally adjusting the current system command pressure input signal by the dither-related power factor and applying the adjusted current system command pressure input signal to the MEMS microvalve via the controller;

wherein the dither-related power factor is measured in watts and is configured to be one of added and subtracted from a power value supplied to the MEMS microvalve to compensate for the dither signal, and may be obtained from the look-up table that includes a plurality of desired dither-related power factors relating to desired target command pressures.

12. The method according to claim 11, further including:
determining a thermal lag compensation power factor from the target command pressure, the current system command pressure input signal, and the transmission system operating temperature received in the controller; and additionally adjusting the current system command pressure input signal by the thermal lag power factor and applying the adjusted current system command pressure input signal to the MEMS microvalve via the controller;

wherein the thermal lag compensation power factor is measured in watts and is configured to be one of added and subtracted from the power value supplied to the MEMS microvalve for a predetermined period of time to heat actuator ribs of the MEMS microvalve, and may be obtained from the look-up table that includes a plurality of desired thermal-lag related power factors relating to desired target command pressures.

* * * * *